United States Patent
de Corral

(10) Patent No.: US 8,485,030 B2
(45) Date of Patent: Jul. 16, 2013

(54) THERMAL LOOP FLOW SENSOR

(75) Inventor: Jose Luis de Corral, Grafton, MA (US)

(73) Assignee: Waters Technologies Corporation, Milford, MA (US)

( * ) Notice: Subject to any disclaimer, the term of this patent is extended or adjusted under 35 U.S.C. 154(b) by 119 days.

(21) Appl. No.: 12/863,294

(22) PCT Filed: Jan. 13, 2009

(86) PCT No.: PCT/US2009/030791
§ 371 (c)(1),
(2), (4) Date: Dec. 20, 2010

(87) PCT Pub. No.: WO2009/091703
PCT Pub. Date: Jul. 23, 2009

(65) Prior Publication Data
US 2011/0100114 A1     May 5, 2011

Related U.S. Application Data

(60) Provisional application No. 61/021,950, filed on Jan. 18, 2008.

(51) Int. Cl.
*G01F 1/68* (2006.01)

(52) U.S. Cl.
USPC ...................................... 73/204.19

(58) Field of Classification Search
USPC ............ 73/204.23, 204.26, 204.11, 202.5, 73/202.2, 204.27, 204.25; 702/45, 12, 13
See application file for complete search history.

(56) References Cited

U.S. PATENT DOCUMENTS

| | | | |
|---|---|---|---|
| 3,181,357 A | 5/1965 | Benson | |
| 4,100,801 A | 7/1978 | LeMay | |
| 4,835,456 A * | 5/1989 | Liu et al. | 324/674 |
| 5,705,745 A | 1/1998 | Treutler et al. | |
| 6,662,121 B1 * | 12/2003 | Oda et al. | 702/45 |
| 7,021,136 B2 * | 4/2006 | Vincze et al. | 73/204.26 |
| 7,036,369 B2 * | 5/2006 | Keppner et al. | 73/204.26 |
| 7,046,922 B1 * | 5/2006 | Sturm et al. | 392/482 |
| 7,257,320 B2 * | 8/2007 | Hartge | 392/451 |

FOREIGN PATENT DOCUMENTS

| | | | |
|---|---|---|---|
| EP | 1031821 | * | 8/2000 |
| EP | 1615001 | | 1/2006 |

OTHER PUBLICATIONS

Wu et al MEMS flow sensor, Jan. 2000.*
Wu, et al; MEMS Flow Sensors for Nano-Fluidic applications. The Thirteenth Annual International Conference on Micro Electro Mechanical Systems, Jan. 23-27, 2000, pp. 745-750.
Bronkhorst High-Tech B.V..; R&D Manager; Liquid flow sensor for nano- and micro-flow ranges; Sensor Review, 25/1 (2005) 20-23.
European search report for EP Application No. 09701775.0, EP Forms 1507S and 1703, date of completion of the search Dec. 21, 2011, 7 pages.
International Search Report for Application No. PCTUS2009/03079, Forms PCT/ISA/210 + 220, dated of completion of the search Feb. 25, 2009, 3 pages.
International Written Opinion Report for Application No. PCTUS2009/03079, Forms PCT/ISA/237, dated of completion of the search Feb. 25, 2009, 7 pages.

* cited by examiner

*Primary Examiner* — Jewel V Thompson
(74) *Attorney, Agent, or Firm* — Waters Technologies Corporation

(57) ABSTRACT

A flow sensor includes a fluidic component, such as a tube, a heat source, an upstream temperature sensor, and a downstream temperature sensors. The fluidic component defines a flow path having inlet and outlet ends disposed closer to each other than to a mid-point of the flow path. The heat source and the upstream and downstream temperature sensors are disposed in thermal communication with a fluid in the flow path.

20 Claims, 4 Drawing Sheets prior art

THERMAL LOOP FLOW SENSOR

CROSS REFERENCE TO RELATED APPLICATIONS

This application claims priority to and benefit of U.S. Provisional Application No. 61/021,950, filed Jan. 18, 2008, the entire contents of which are incorporated herein by reference.

TECHNICAL FIELD

The invention generally relates to apparatus and methods for fluid flow-rate measurements. More particularly, the invention relates to measurement of flow rates in chromatography apparatus that operate at relatively high pressures and relatively low flow rates.

BACKGROUND INFORMATION

Many processes require measurement and control of the flow rate of small amounts of a liquid. Such processes include those employed in the life sciences, chemical analysis (such as liquid chromatography) biotechnology, chemical synthesis and nanotechnology.

Some liquid flow sensors determine a flow rate by utilizing the thermal behavior of a liquid passing through a section of tubing. For example, some nano-flow sensors measure liquid velocity by determining heat transfer rate. Such a sensor typically observes a flow-rate related variation of a fluid's temperature along the tube.

One type of commercially available low-flow thermal flow-rate sensor uses two active elements, each of which acts as both a heater and a temperature sensor. The temperature difference between the two elements provides a measure of flow rate. FIG. 1 is a block diagram of such a flow sensor 100. The sensor 100 includes a flow tube 110, and two active elements 120, 130 disposed in contact with the tube, upstream and downstream relative to each other. For low flow-rate chromatography applications, the tube 100 is typically formed of stainless steel, a polymer or fused silica. Depending on the flow-rate range of interest, the internal diameter is in a range of approximately 25 μm to 250 μm, and the internal volume is in a range of approximately 20 nl to 2 μl.

The active elements 120, 130 are wire coils, wound around the tube 110. The elements 120, 130 are both heat sources and temperature sensors. The elements 120, 130 introduce heat to a fluid in the tube 110 when a current is passed through the coils; their temperature is measured by monitoring the resistance of the coils, which changes with a change in temperature.

The flow sensor 100 is typically operated in a constant-power mode, for flow rates below approximately 100 μl/min, and in a constant-temperature mode, for higher flow rates. In the constant power mode, equal power is supplied to both elements 120, 130, and their temperature readings are used to determine the flow-rate.

In the constant-temperature mode, the upstream element 120 acts as a heater and the downstream element 130 need only act as a temperature sensor. Sufficient power is delivered to the upstream heater 120 to maintain a constant temperature difference, ΔT, between the upstream element 120 and the downstream sensor 130. The supplied power provides a measure of the flow rate.

The flow sensor 100 utilizes an electronic circuit based on a Wheatstone bridge configuration. The circuit converts the output signals, associated with ΔT or power, into an output voltage that has a linear relationship with the mass flow of liquid in the tube 110.

The temperature at each element 120, 130 depends on the ambient environment, electrical current, coil resistance, conduction of heat through the tubing, conduction of heat through the fluid in the tube 110, convection of fluid in the tube 110 (typically dominated by flow) and, probably to a lesser extent, heat transmission between the surface of the tube 110 and its surroundings.

The sensor 100 communicates with the ambient, notably, via heat transmission along the liquid and along the tube 110. Use of metallic tubing can lead to substantial conduction of heat along the tube 110. If the ambient temperature variations cause a difference in temperature between the elements 120, 130, a temperature difference is observed even when the flow rate is zero. This problem is exacerbated when the ambient temperature spatial distribution varies over time, causing a temporal variation of the temperature offset between the elements 120, 130. To mitigate this problem, some flow sensors include an aluminum container within which a flow tube 100 is disposed.

Flow sensors can be calibrated at different temperatures to help compensate for ambient-temperature effects. Available sensors also typically have an output that is different for different liquids, such as the different solvents used in some types of chromatography. A correction factor can be applied to compensate for this effect. A correction factor, however, may be unavailable for a particular liquid, or use of a mixture of different liquids can complicate this problem.

SUMMARY OF THE INVENTION

Some embodiments of the invention are based on the realization that one can mitigate the effects of ambient temperature in a tube-based mass-flow sensor by providing a common ambient environment at upstream and downstream locations of a tube. For example, the common ambient is achievable by, at least in part, configuring the tube so that portions of the upstream and downstream sections of the tube, such as the ends of the tube, have a common ambient temperature.

The common temperature is obtained, for example, by providing sufficient thermal communication between the ends of a tube so that the ends tend to equilibrate in temperature. Sufficient thermal communication is provided, in some embodiments of the invention, by positioning the ends of a tube adjacent to one another. In some of these embodiments, the tube has a loop shape. A single temperature sensor optionally disposed at the adjacent ends of the tube provides a temperature measurement that is common to both an upstream end and a downstream end of the tube. These embodiments thus mitigate, for example, the effects of tubing ends that are connected to additional tubing having different temperatures.

Through implementation of principles of the invention, the imbalanced effect of heat conduction along a tube, found in some prior flow sensors, is mitigated. In some cases, mitigation is provided for detrimental effects of both spatial and temporal fluctuations of ambient temperature. Principles of the invention are optionally utilized in forcing the tube ends to have and maintain substantially the same temperature even if the ambient temperature fluctuates.

The invention also arises, in part, from the realization that provision of a common heat sink, for upstream and downstream ends of a tube, optionally provides the above-described benefits. Thus, some embodiments of the invention mitigate problems associated with some commercially available low-flow sensors, such as susceptibility to ambient temperature, including its spatial non-uniformity and its temporal changes. Some embodiments of the invention reduce or eliminate a need to correct for variations in ambient temperature and to correct for different fluids having different thermal behavior.

Moreover, some embodiments of the invention utilize point-source heaters that are smaller than typical coil-based heaters. Similarly, some embodiments utilize temperature sensors having a small area and or a small length relative to a tube length.

Accordingly, one embodiment of the invention features a flow sensor that includes a fluidic component, a heat source, and upstream and downstream temperature sensors, one of which is optionally a shared component with the heat source. The fluidic component defines a flow path having inlet and outlet ends disposed closer to each other than to a mid-point of the flow path. The heat source is disposed in thermal communication with a fluid in the flow path as are the upstream and downstream temperature sensors. The downstream temperature sensor is disposed at a location downstream of the upstream temperature sensor.

Another embodiment of the invention features a method for sensing flow using a flow sensor that includes at least two temperature sensors and at least one heat source. The method includes determining a value of a flow-rate parameter associated with a ratio of the temperature difference to at least one of the temperatures. The parameter is substantially independent of the output of the at least one heat source.

Still another embodiment of the invention features a method for sensing flow using a flow sensor that includes at least two temperature sensors and at least one heat source. The method includes determining a value of a flow-rate parameter that is associated with a ratio of the temperature difference to a value related to an empty-flow-path condition. The parameter mimics a behavior of the flow sensor as if a fluidic component, such as a tube, had an infinite thermal resistance. The parameter is substantially independent of fluid type.

Many embodiments of the invention reduce cost, complexity and size relative to some prior flow-rate sensors. Thus some embodiments eliminate a need to utilize a temperature-controlled chamber to reduce spatial and/or temporal ambient-temperature fluctuations. Some embodiments also reduce or eliminate a need to calibrate for thermal-behavior differences between different solvents. Such embodiments provide, for example, improved sensitivity, automatic compensation for different solvents, flow-rate determination down to 1 nl/min or less, response time of 5 seconds or less, and/or reduced cost of sensor construction.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

FIG. 2b is a top-view diagram of the substrate of the flow sensor of FIG. 2a; and FIG. 3 is a schematic diagram of a simplified equivalent thermal circuit associated with the flow sensor of FIG. 2a.

DETAILED DESCRIPTION

The term "nano-flow" herein refers to fluid-flow rates of less than approximately 100 μL/min or, preferably, less than 10 μL/min. Nano-flow rates are useful, for example, in some applications of liquid chromatography performed at pressures of 1,000 psi or greater, and at even higher pressures, such as 5,000 to 10,000 psi or greater.

Some embodiments of the invention involve apparatus that include both chromatographic and mass-spectrometric components. In some of these embodiments, a chromatographic component is placed in fluid communication with a mass-spectrometric component through use of an appropriate interface, such as an electrospray-ionization interface.

Figure 1:
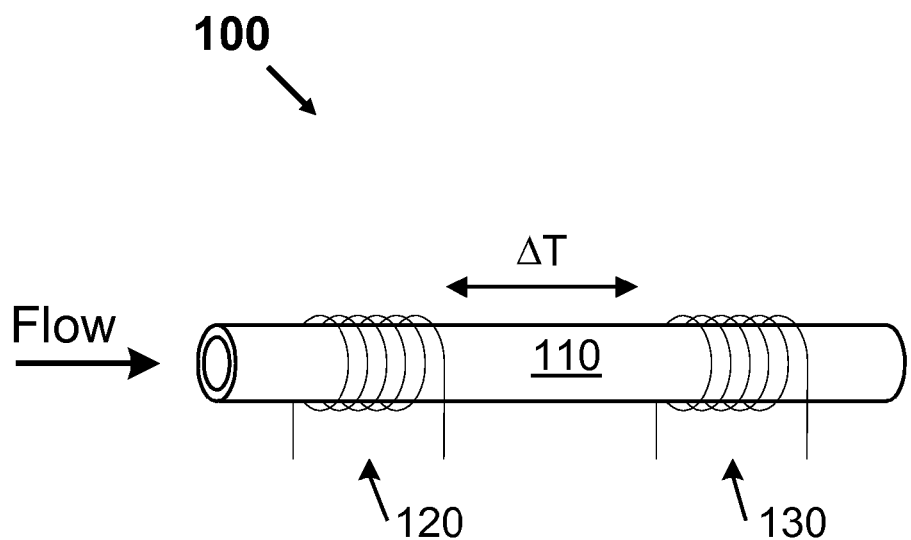
FIG. 1 is a block diagram of a prior-art flow sensor.
Figure 2A:
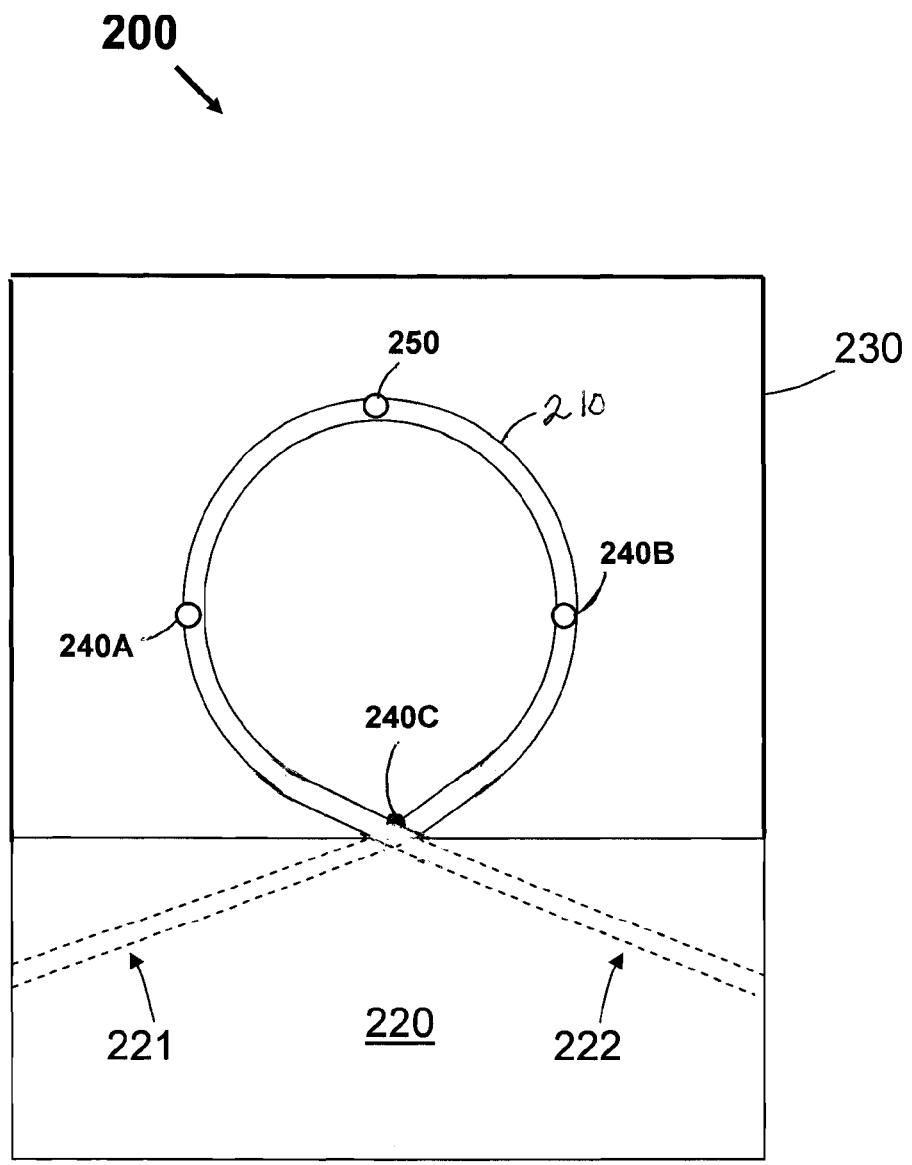
FIG. 2a is a cross-sectional side-view diagram of a flow sensor, in accordance with one embodiment of the invention.

FIG. 2a is a cross-sectional side-view diagram a flow sensor 200, in accordance with one embodiment of the invention. The flow sensor 200 includes a tube 210 having a loop shape, a substrate 220 in fluidic communication with the tube 210, a heater 250, upstream and downstream temperature sensors 240A, 240B, and a tube-end temperature sensor 240C, The temperature sensors 240A, 240B, 240C are in thermal communication with a fluid in the tube 210. The sensor 200 also includes an isolation cover 230 that is attached, directly or indirectly, to the substrate 220.

Figure 2B:
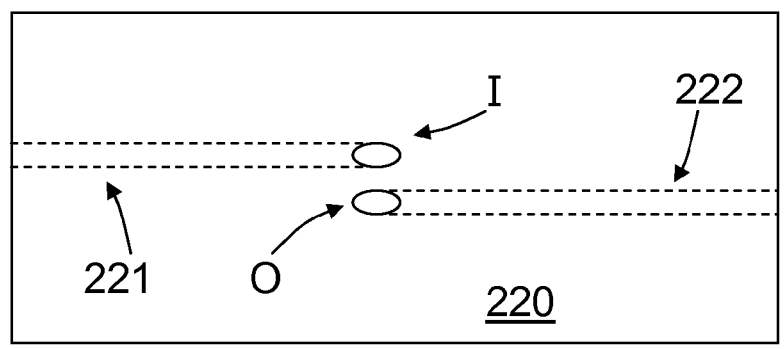

FIG. 2b is a top-view diagram of the substrate 220 of the flow sensor 200. The substrate 220 provides an inlet conduit 221, which mates, for example, to additional tubing of a chromatography apparatus that carries a liquid whose flow rate is to be measured. In the case of a liquid chromatography system, the liquid is optionally a solvent. The inlet conduit 221 has a port I that mates to the inlet end of the tube 210. The conduit 221 and tube 210 are attached in any suitably fluid-tight manner, including using, for example, fluidic connectors known in the chromatography arts. Similarly, the substrate 220 has an outlet conduit 222, which has a port O to mate with the outlet end of the tube 210. The outlet conduit 222 interfaces to additional tubing, for example, to deliver a solvent to a chromatography column.

The substrate 220 physically supports the ends of the tube 210 and provides thermal communication between the ends of the tube 210. To enhance thermal communication, the substrate 220, or a portion of it, is optionally formed of a material having a relatively high thermal conductance, such as aluminum. The substrate 220 optionally also acts as a thermal mass, tending to reduce temporal fluctuations of the ambient temperature at the ends of the tube 210. The substrate 220 is optionally formed of more than one material and/or component.

The cover 230, in cooperation with the substrate 220, isolates the tube 210. The cover 230 optionally encloses a vacuum or a thermally isolating material. Conductive, convective and radiant loss and/or absorption of heat, via the surface of the tube 210, is thus minimized.

The heater 250 is any component or components suitable for heating a fluid in the tube 210, including known component(s). For example, the heater 250 optionally includes a metallic wire or other material whose temperature rises in response to an electrical current. The heat source 250, for example, is a surface-mount resistor, such as is used in electronics applications.

In some implementations of the flow sensor 200, the heat source 250 has a smaller size than the size of a typical coil found in some prior-art flow sensors. For example, a desirable resistor-based heat source has, for example, a footprint of approximately 1 sq mm, or less.

The heater 250 optionally includes a resistive semiconducting material. For example, a thermistor is optionally used as the heater 250. As is generally understood, a thermistor is a temperature-sensing device that includes a resistor whose resistance changes with temperature. Thus, a thermistor is optionally used to provide heat and/or is optionally used to sense temperature. For example, the heater 250 optionally also functions as a temperature sensor.

The temperature sensors 240A, 240B, 240C include any suitable temperature sensors, including known sensors such as thermocouple- or thermistor-based temperature sensors. Some suitable thermocouples and thermistors have a footprint of approximately 1 sq mm, or less. In comparison to a typical coil-based temperature sensor, a thermistor has an advantage of providing a relatively large resistance change per unit of temperature change. A thermistor thus potentially requires less, or no amplification, of its output signal and potentially produces less noise than some other temperature sensors.

Some embodiments of the invention include heater(s) and/or temperature sensor(s) having a size small enough to approximate a point heat source and/or a point temperature sensor. For the purposes of the present description, a point source/sensor is understood as having a length dimension that is approximately equal to or less than 1/40 of the length of a sensor tube, such as the tube 210 of the flow sensor 200.

A point heat source has the advantage, for example, of providing a higher temperature profile than a relatively distributed heat source that would tend to clip the peak achieved temperature, for a given heat output. Moreover, the clipped temperature peak would tend to be distributed over a portion of the length of a tube, rather than providing a relatively sharp peak as is optionally achieved with a point heat source.

In a related manner, a point temperature sensor tends to provide a more accurate temperature readings of a fluid flowing past the point temperature sensor, in comparison to a spatially distributed temperature sensor. The latter would tend, for example, to clip a peak in a temperature profile of a fluid having a rapidly varying temperature fluctuation, by in effect measuring an average temperature associated with a relatively long portion of a flow tube.

Any suitable tubing and tubing material, including known tubing and materials, is optionally used in fabrication of the tube 210. For example, stainless steel tubing provides a relatively low thermal conductivity, in comparison to many other metals, and has suitable chemical and physical behavior for many applications. Ideally, for some embodiments, the material would have an infinite thermal resistance.

Some embodiments of the invention entail flow sensors configured for liquid chromatography applications, supporting measurement of flow rates in the nL/min, µL/min, and/or mL/min ranges. For example, in one illustrative nano-flow rate chromatography-based implementation, the tube 210 is formed of stainless steel, has an outer diameter of 0.0508 cm, an inner diameter of 0.0254 cm, and a loop length of 4.0 cm. The fluid is a liquid, such as a solvent, such as water and/or acetonitrile.

Some further embodiments of the invention include a control unit that receives output signals from inlet and outlet temperature sensors, and is configured to process the signals to provide flow-rate data and/or operation of a flow sensor and/or an apparatus that includes the sensor. For example, a control unit is configured to accommodate non-linearity of temperature sensors and behavior mismatch between the temperature sensors.

For example, a control unit optionally converts signals received from temperature sensor(s) into flow-rate readings and/or controls power output of heater(s). Moreover, a control unit is optionally configured to accommodate non-linearity of a temperature sensor. For example, a thermistor's linearized output signal slope is optionally measured and stored. Matched slope thermistor outputs are then used, optionally, to calculate an output of a flow sensor that is independent of an ambient temperature.

A control unit, in various illustrative embodiments, is implemented in software, firmware, and/or hardware (e.g., as an application-specific integrated circuit), and includes, if desired, a user interface. The control unit includes and/or is in communication with storage component(s). Suitable implementations of a control unit include, for example, one or more integrated circuits, such as microprocessors. A single integrated circuit or microprocessor, in some alternative embodiments, includes the control unit and other electronic portions of chromatography apparatus. In some embodiments, one or more microprocessors implement software that enables the functions of a control unit. In some embodiments, the software is designed to run on general-purpose equipment and/or specialized processors dedicated to the functionality herein described.

The flow sensor 200 is optionally characterized, in a simplified manner, as described next with reference to FIG. 3. The following description is not intended to limit theoretical analyses or configurations of any embodiment of the invention, and is presented to illustrate some possible interpretations of the behavior of the flow sensor 200; some of these interpretations provide convenient correlations between a flow rate and a calculated parameter that is determined from the output signals of the heater 250 and the temperature sensors 240A, 240B, 240C. For example, selection of an appropriate output parameter optionally provides a determination of a value that is independent or nearly independent of solvent type.

Figure 3:
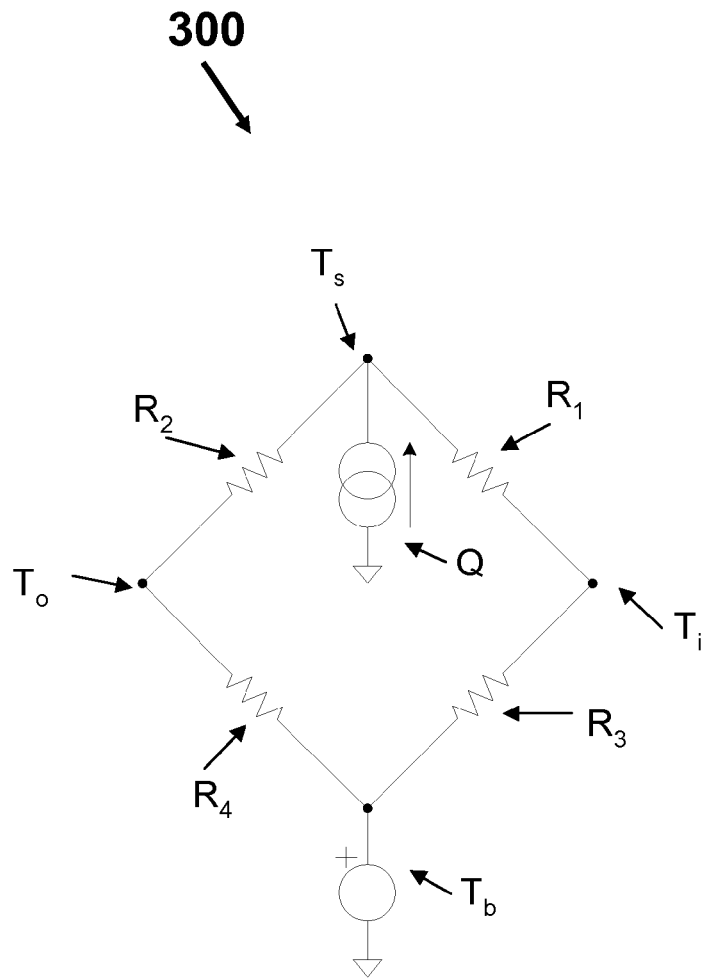

FIG. 3 is a schematic diagram of a simplified equivalent thermal circuit 300 associated with the flow sensor 200. The circuit 300 includes: four loop thermal resistances $R_1$, $R_2$, $R_3$, $R_4$ corresponding to the four sections of the tube 210 that are defined by the locations of the temperature sensors 240A, 240B, 240C and the heater 250; the power output, Q, of the heater 250; the temperature, $T_s$, at the location of the heater 250; a base temperature $T_b$, measured by the temperature sensor 240C at the ends of the tube 210; an inlet side temperature $T_i$ measured by the inlet temperature sensor 240A; and an outlet side temperature $T_o$ measured by the outlet temperature sensor 240B.

Each of the resistances $R_1$, $R_2$, $R_3$, $R_4$ is a combination of a tubing-related resistance, herein referred to with the symbol $R_t$, and a fluid-related resistance, herein referred to with the symbol $R_s$. The fluid-related resistance, $R_s$, varies with the flow rate of the fluid in the tube, while the tubing-related resistance, $R_t$, is a constant.

For the analysis of the circuit 300, presented below, the temperature sensors 240A, 240B and the heater 250 are assumed to be located so that the resistances $R_1$, $R_2$, $R_3$, $R_4$ are all equal at zero flow. This would typically be accomplished by disposing the temperature sensors 240A, 240B at locations equidistant from the tube-end temperature sensor 240C and the heater 250; thus, the loop is symmetrically configured. Further, it is assumed that no heat flows radially between a portion of the tube 210 and the fluid flowing through that portion; thus each resistance $R_1$, $R_2$, $R_3$, $R_4$ is a parallel combination of its tubing resistance, $R_t$, and fluid resistance, $R_s$. For additional simplification, each resistance $R_1$, $R_2$, $R_3$, $R_4$ is assumed to vary linearly with the flow rate, herein referred to as F, with a constant factor, herein referred to as α. Equations 1a and 1a provide relationships between the resistance values and the flow rate:

$$R_2 = R_3 = \frac{R_t \cdot R_s \cdot (1 - \alpha \cdot F)}{R_t + R_s \cdot (1 - \alpha \cdot F)} \quad (1a)$$

$$R_1 = R_4 = \frac{R_t \cdot R_s \cdot (1 + \alpha \cdot F)}{R_t + R_s \cdot (1 + \alpha \cdot F)} \quad (1b)$$

From these considerations, various relationships between the above-defined circuit components are derivable. For example, Equations 1c, 1d and 1e provide relationships between temperature readings and resistance values and power output values:

$$T_o - T_i = \frac{1}{2} Q (R_1 - R_2) \quad (1c)$$

$$T_s - T_b = \frac{1}{2} Q (R_1 + R_2) \quad (1d)$$

$$\frac{T_o - T_i}{2} - T_b = \frac{1}{4} Q (R_1 + R_2) \quad (1e)$$

The temperature readings $T_s$, $T_b$, $T_i$, $T_o$, are utilizable in a variety of ways to provide a calculable parameter correlated to flow rate, F. Once a suitable parameter is selected, a value of the flow rate, F, is obtainable via temperature measurements. For example, the parameter, $P_A$, shown in Equation 2, provides one such correlation with flow rate:

$$P_A = \left(\frac{T_o - T_i}{T_s - T_b}\right) = \frac{\alpha \cdot F}{1 + (1 - \alpha^2 \cdot F^2) \cdot \frac{R_s}{R_t}} \quad (2)$$

where $P_A$, as shown, can be calculated from temperature measurements, and is independent of the heat output, Q, of the heat source 250. Note that this independence does not rely on use of a loop-shaped tube; a sensor based on a straight tube optionally also benefits from use of a parameter, such as $P_A$, to obtain measurements that are independent of heat output.

$P_A$ has a quadratic relationship to flow rate, F. Moreover, the relationship is approximately linear if $R_t \gg R_s$, as might be obtained, for example, by using a tube 210 having a very thin wall and/or formed of a material having a high thermal resistivity relative to the fluid in the tube 210. Thus, a measured value for $P_A$ provides a flow rate value, either from a theoretical correlation to flow rate, for example, using Equation 2, or by empirically establishing a relationship.

Equation 3 provides an example of another parameter, $P_B$, that gives a correlation to the flow rate, F:

$$P_B = \left(\frac{T_o - T_i}{\frac{T_o + T_i}{2} - T_b}\right) = 2 \cdot \frac{\alpha \cdot F}{1 + (1 - \alpha^2 \cdot F^2) \cdot \frac{R_s}{R_t}} \quad (3)$$

Both $P_A$ and $P_B$ provide an approximately linear relationship to flow rate, F, for parameter values up to approximately 1/10 of $1/\alpha$. These parameter values also vary with solvent type, via the solvent resistance $R_s$, for a given flow rate, F. The solvent-type dependence arises from the parallel thermal resistance of the tubing and that of the fluid flowing through the tubing. In theory, for the models of both Equations 2 and 3, provision of an infinite tubing resistance, $R_t$, would eliminate the solvent dependence of the parameter, $P_B$.

Extending the above-described specific example of a flow sensor configured for a nano-flow rate chromatography system, the tube is formed of stainless-steel tubing having an outer diameter of 0.0508 cm, an inner diameter of 0.0254 cm and a length of 4.0 cm, the fluid is water and/or acetonitrile, $\alpha$ is $1/(100 \, \mu l/min)$ and Q is 0.1 W. The flow sensor output, using $P_A$ or $P_B$, is thus substantially linear to approximately 10 $\mu l/min$, i.e., substantially linear at low flow rates.

As noted, the parameters described above, i.e., $P_A$ and $P_B$, are independent of the magnitude of the heat output, Q, of the heat source 250. More generally, parameters that provide heat magnitude independence are obtained by using as few as two temperature readings, for example, from two temperature sensors or from one temperature sensor and from a heat source.

In some embodiments, such as those described above, a heat-magnitude-independent parameter has the general form of a fraction having a numerator and a denominator whose heat dependence cancels or substantially cancels. For example, in one alternative embodiment, the numerator is $\Delta T$ (the temperature difference between temperature readings at two locations), and the denominator is one of the temperature readings. More generally, for many embodiments, a heat-out-independent parameter is associated with a ratio of the temperature difference between two temperature sensors to at least one temperature reading from one of the sensors and/or another sensor.

Independence from heat-source magnitude has numerous benefits. For example, some implementations of the invention do not require careful control of output of a heat source and/or utilize a lower cost heat source than some existing flow sensors.

Alternative parameters are optionally utilized, some of which are independent or substantially independent of solvent type. For example, two such parameters, modified versions of $P_A$ and $P_B$, as described next, provide solvent-type independence by accounting for the thermal conductivity of the tube 210 through use of a term, herein referred to as $T_{empty}$. In these two examples, illustrated below in Equations 4 and 5, $T_{empty}$ is equal to the denominator of the parameter $P_A$ or twice the denominator of parameter $P_B$, with no fluid present in the tube 210. Either approach to calculating $T_{empty}$ is optionally used as the denominator in either Equation 4 or 5 to obtain a substantially solvent-type-independent parameter. Use of the term $T_{empty}$, or similar modifications, provides parameters that mimic the behavior that would be obtained if a tube had infinite thermal resistance.

For an "empty" tube condition, thermal conduction along the tube 210 arises substantially from the tube itself. A value for $T_{empty}$ is obtained, for example, theoretically or empirically by taking temperature measurements while the tube 210 is filled with gas or contains a vacuum.

Equation 4 shows a modified parameter, $P_C$, which is measured, in one embodiment, to provide the flow rate, F, while substantially reducing the effect of a change in solvent type:

$$P_C = \frac{T_o - T_i}{T_{empty} - (T_o + T_i - 2 \cdot T_b)} \quad (4)$$

Equation 5 shows a second, alternative, modified parameter, $P_D$, which provides calculated values that are independent of solvent type.

$$P_D = \frac{T_o - T_i}{T_o + T_i - 2 \cdot T_b - \frac{4 \cdot (T_o - T_b) \cdot (T_i - T_b)}{T_{empty}}} \quad (5)$$

Some parameters, such as those illustrated by Equations 4 and 5, mimic the behavior of a flow-sensing component as if the fluidic component had an infinite thermal resistance; thus, $P_C$ and $P_D$ are associated with a ratio of a temperature difference to a value related to an empty flow-path condition.

Some solvent-independent parameters are optionally derived from a back-calculation of the values of the solvent resistance, to obtain a flow measurement value as if the tubing had infinite thermal resistance. Note that the above-described parameters having solvent-type independence do not rely on use of a loop-shaped tube; a sensor based on a straight tube optionally also benefits from use of a parameter, similar in derivation to $P_C$ and $P_D$, to obtain measurements that are independent of solvent type.

Measured values of the modified parameters, $P_C$ and $P_D$, have a dependence on the heat output. Further modification, in a manner, for example, as described above, is optionally applied to provide parameters that have measured values that are independent of selection of both heat-output magnitude and solvent type.

Some embodiments, such as those utilizing $P_C$ and $P_D$, provide substantial or complete independence from ambient temperature and solvent type, relatively high sensitivity, relatively low noise, and a linear response.

Some embodiments of flow sensors provide multiple ranges of measurable flow rate. A measurable flow-rate range is selectable, for example, in association with positioning of temperature sensors. For example, in combination with use of the parameter, $P_A$, of Equation 2, the equidistant disposition of the temperature sensors 240A, 240B provides a flow-rate range that covers a lowest range of flow-rate values; that is, both the smallest and greatest values in the range are at a minimum. This implementation also provides a highest sensitivity of flow-rate measurement for the flow sensor 200. Alternatively, the temperature sensors 240A, 240B are disposed at different locations to provide different measurable flow-rate ranges for the flow sensor 200.

For example, again in combination with use of $P_A$, positioning the temperature sensors 240A, 240B closer to the heater 250 than to the tube-end temperature sensor 240C, or vice versa, increases both the maximum and minimum measurable flow rates relative to their values for the above-described equidistant configuration. That is, the closer the upstream and downstream temperature sensors 240A, 240B are positioned to the heater 250 or to the tube-end temperature sensor 240C, the higher the flow rate range obtained. Therefore, these non-equidistant configurations provide less flow-rate sensitivity, but higher flow rate ranges.

As one specific example, positioning the sensors 240A and 240B three times as far from the tube-end sensor 240C as from the heater 250, increases both the maximum and minimum measurable flow rates by 33%.

Some embodiments support more than one flow-rate range by inclusion of additional upstream and/or downstream temperature sensors. For example, a flow sensor optionally includes a pair of sensors at equidistant positions, a second pair midway between the first pair and the heat source, and a third pair midway between the second pair and the heat source.

The present invention has been described with respect to some illustrative embodiments with the understanding that those skilled in the art will be able to make alterations and modifications to such embodiments in view of the description provided herein. For example, alternative embodiments of the invention need not include the same, or all of, the features of any described embodiment. For example, alternative embodiments of a flow sensor include two or more heaters and/or fewer or greater than three temperature sensors, and/or include two or more tubes disposed, for example, in series and/or in parallel. Heater source(s) and/or temperature sensor(s) are provided at symmetrical and/or asymmetrical locations. Moreover, a flow path can be provided in a variety of fluidic components other than a tube. Therefore, the invention should not be limited to the precise details set forth herein but should encompass the subject matter of the following claims and their equivalents.

The invention claimed is:

1. A flow sensor, comprising:
   a fluidic component defining a flow path having an inlet end and an outlet end disposed adjacent to each other, thereby providing sufficient thermal communication between the inlet and outlet ends to provide a common temperature;
   a heat source disposed in thermal communication with a fluid in the flow path;
   an upstream temperature sensor disposed in thermal communication with the fluid in the flow path; and
   a downstream temperature sensor disposed in thermal communication with the fluid in the flow path at a location downstream of the upstream temperature sensor.

2. The flow sensor of claim 1, wherein the fluidic component comprises a tube.

3. The flow sensor of claim 2, wherein the tube is shaped in the form of a loop.

4. The flow sensor of claim 1, wherein the heat source is disposed adjacent to a mid point of the flow path to heat the fluid as it flows through the mid-point of the flow path.

5. The flow sensor of claim 1, wherein the heat source is disposed along the flow path between the upstream temperature sensor and the downstream temperature sensor.

6. The flow sensor of claim 5, wherein the upstream and downstream temperature sensors are each substantially equidistant from the heat source and the inlet and outlet ends of the flow path.

7. The flow sensor of claim 1, further comprising a substrate, in thermal communication with the inlet and outlet ends of the flow path, that provides a common ambient temperature for the inlet and outlet ends of the flow path.

8. The flow sensor of claim 7, wherein the substrate defines an inlet passage and an outlet passage that, respectively, mate with the inlet end and the outlet end of the flow path.

9. The flow sensor of claim 7, further comprising an isolation cover that at least partially surrounds the fluidic component, and is disposed in physical communication with the substrate.

10. The flow sensor of claim 1, further comprising an end temperature sensor disposed in thermal communication with the inlet and outlet ends of the flow path.

11. The flow sensor of claim 1, wherein at least one of the temperature sensors comprises a point temperature sensor.

12. The flow sensor of claim 1, wherein the heat source comprises a point heat source.

13. The flow sensor of claim 1, further comprising a second upstream temperature sensor and a second downstream temperature sensor, each in thermal communication with the fluid in the flow path at locations to support measurement of a different flow-rate range than a flow-rate range supported by the upstream and downstream temperature sensors.

14. The flow sensor of claim 13, wherein the second upstream and downstream temperature sensors are each disposed closer to or further from the heat source than the upstream and downstream temperature sensors.

15. The flow sensor of claim 1, further comprising a control unit that receives output signals from the upstream and downstream temperature sensors, and is configured to process the signals to accommodate non-linearity of the temperature sensors and behavior mismatch between the temperature sensors.

16. The flow sensor of claim 1, wherein the fluidic component has a thermal resistance that is much greater than a thermal resistance of the fluid.

17. The flow-rate sensor of claim 1, wherein the heat source is collocated or is a common device with one of the temperature sensors.

18. The flow sensor of claim 1, wherein the flow path is configured for measurement of nano-flow rates.

19. A method for sensing flow, comprising:
providing a flow-sensing component, comprising
    a fluidic component defining a flow path having an inlet end and an outlet end disposed adjacent to each other, thereby providing sufficient thermal communication between the inlet and outlet ends to provide a common temperature,
    a heat source disposed to deliver heat to a fluid in the flow path,
    an upstream temperature sensor disposed in thermal communication with the fluid in the flow path, and
    a downstream temperature sensor disposed in thermal communication with the fluid, the temperature sensors have a temperature difference at least if the fluid is flowing;
determining a value of flow rate parameter that is substantially independent of a magnitude of the delivered heat, wherein the parameter is associated with a ratio of the temperature difference to at least one of the temperatures.

20. A method for sensing flow, comprising:
providing a flow-sensing component, comprising
    a fluidic component defining a flow path having an inlet end and an outlet end disposed adjacent to each other, thereby providing sufficient thermal communication between the inlet and outlet ends to provide a common temperature,
    a heat source disposed to deliver heat to a fluid in the flow path,
    an upstream temperature sensor disposed in thermal communication with the fluid in the flow path, and
    a downstream temperature sensor disposed in thermal communication with the fluid, the temperature sensors have a temperature difference at least if the fluid is flowing;
determining a value of a flow-rate parameter that is substantially independent of fluid type, wherein the parameter mimics a behavior of the flow-sensing component if the fluidic component had an infinite thermal resistance, the parameter being associated with a ratio of the temperature difference to a value related to an empty flow path condition.

* * * * *